United States Patent Office 2,754,175
Patented July 10, 1956

2,754,175
PROCESS FOR TREATING WASTE ACID

Frank J. Hendel, Newark, N. J., assignor to Wigton-Abbott Corporation, Plainfield, N. J., a corporation of New Jersey No Drawing. Application July 14, 1952,
Serial No. 298,835

2 Claims. (Cl. 23—128)

This invention relates to the processing of waste oleum and waste sulfuric acid containing organic impurities to convert these troublesome waste liquors into useful by-products. More particularly, the invention relates to a process for treating spent oleum and waste sulfuric acid to effect a substantially quantitative conversion of the sulfate component thereof to Epsom salt ($MgSO_4.7H_2O$).

The extensive use of oleum and sulfuric acid in organic chemical processes leads to vast quantities of waste oleum and sulfuric acid liquors which present a serious waste disposal problem. Such waste liquors frequently contain considerable quantities of various organic materials which prevent or interfere with subsequent use of the acid as a process reagent. While in some instances the type or amount of organic impurities remaining in the waste acids would suggest that steps be taken to recover these materials, the cost of such recovery is frequently so great as to be commercially prohibitive. On the other hand, simple neutralization to destroy the acidity of the waste liquors will generally leave the organic impurities substantially unaffected and these organic impurities may constitute as serious a problem as the acid itself from the standpoint of waste disposal.

I have now discovered a practical and efficient process for treating waste oleum and sulfuric acid containing organic impurities whereby the sulfate component is directly converted to a commercially useful product and at the same time the problem of residual waste disposal is completely avoided. In particular, I have found that it is possible in a practical way to convert the sulfate component of waste oleum and sulfuric acid directly to Epsom salt of U. S. P. quality, a product of distinct commercial value.

Regarded in certain of its broader aspects, the novel process in accordance with my invention comprises neutralizing the waste acid with magnesium hydroxide to form a slurry having a pH of about 7–8, drying and roasting said slurry at temperatures up to about 1200° F. until the organic materials present are fully destroyed, transferring the resulting hot mass to water to dissolve soluble components, filtering the resulting solution while hot, and cooling the filtrate to thereby crystallize Epsom salt therefrom.

It will be understood that my process can be applied equally well to spent acids containing small amounts of organic impurities as well as spent acids which contain substantial amounts of such impurities. On the other hand it is within the purview of my invention when commercially feasible to first treat the spent acid to recover a portion of the organic material therein and then subject the residual acid to neutralization, roasting, and further processing as above described.

My process is particularly advantageous for the treatment of waste oleum resulting from DDT production wherein residual DDT, para-chlorobenzene-sulfonic acid are present as organic impurities and for the treatment of waste sulfuric acid resulting from chloral production containing residual ethyl alcohol and other organic components. It will be noted, however, that since my process involves the direct burning or distillation coupled with burning of the organic substances present in the waste acid, the process is one which has general applicability to the treatment of waste oleum and waste sulfuric acid resulting from many types and kinds of organic syntheses.

The magnesium hydroxide which I employ as a neutralizing agent is preferably in the form of a so-called "mud" of magnesium hydroxide which is an intermediate product obtained in preparing magnesia from brines. In other words, the neutralizing agent is an unrefined material available in substantial amounts at moderate cost.

In carrying out the neutralization, it is preferable to use a slight excess of the neutralizing agent as this will insure substantially quantitative reaction with the sulfate component of the spent acid, and any unreacted neutralizing agent will remain undissolved when the roasted product is treated with water to dissolve the Epsom salt.

The neutralizing mixture can be fed to the roasting chamber with varying amounts of water, although from a practical standpoint, the amount of water should be kept at a minimum in order that excessive heat need not be expended in drying the neutralizing mixture prior to the actual roasting process. The drying and roasting can be effectively carried out in a continuous rotary kiln although it will be apparent that various types of drying and roasting apparatus can be employed.

The roasting is preferably carried out at temperatures of about 1200° F. and in a moderately oxidizing atmosphere to facilitate combustion of the organic components. If a neutral or insufficiently oxidizing atmosphere is employed, a combustion of organic materials may be incomplete leaving the roasted product colored with residual carbon. In such event, however, the carbon can be separated by filtering the solution obtained by dissolving the roasted product before the solution is cooled for crystallization of Epsom salt therefrom. The roasting temperature of about 1200° F. is considered preferable for the reason that at lower temperatures, complete combustion of the organic components is difficult, and at appreciably higher temperatures some decomposition of the desired magnesium sulfate may result. The time of roasting will of course, depend upon the quantity of moisture and organic components to be removed. As a general rule, however when a moderately oxidizing atmosphere is maintained during roasting, the roasting should be continued until the product is essentially pure white in color. In an incompletely roasted product, dark deposits of carbon or partially decomposed organic components will be visible thus providing a practical indicator for controlling the roasting time required.

After roasting the substantially pure white product is preferably transferred directly to cold water, the amount of water being not greatly in excess of the amount required to dissolve the magnesium sulfate. In this connection, it will be noted that the heat of the roasted product is transferred to the water so that the resulting solution is a hot water solution. This solution should be filtered while hot to remove residual magnesium hydroxide employed in the neutralization as well as any carbon which may be present due to incomplete combustion. The filtrate is then cooled or, if necessary, first concentrated to the point of substantial saturation and then cooled to crystallize Epsom salt therefrom. The Epsom salt thus initially obtained is generally of such purity that recrystallization for further purification is not necessary.

As a further adaptation of my invention, particularly when substantial amounts of organic components are present in the waste acid, it is sometimes desirable to add hot water to the neutralized slurry in an amount just sufficient to dissolve soluble components thereof, remove any insoluble material by filtration, and then progressively cool the filtrate to effect a fractional crystallization and separation of soluble components. Thus, for example in a waste acid or oleum resulting from DDT production and containing both residual DDT and para-chlorobenzene-sulfonic acid, the DDT would remain undissolved in the hot slurry and could be recovered by filtration. Then upon partial cooling of the resulting filtrate, the bulk of the magnesium salt of para-chlorobenzene-sulfonic acid formed in the neutralization can be precipitated at a temperature of about 48° F. Further cooling after filtering off this precipitate will cause crystallization of crude Epsom salt containing only small amounts of organic impurities and this crude product can then be roasted in the manner described, dissolved in water and crystallized to produce pure Epsom salt. The question of whether or not to separate organic components from neutral slurry depends primarily upon economic factors and whether the recovered products are of sufficient value and importance to warrant the somewhat more extensive treatment required for effecting the separation.

The following examples will serve to show how procedures in accordance with my invention can be carried out. It is to be understood, however, that these examples are given by way of illustration and not of limitation.

Example 1

A quantity of waste oleum from DDT production containing about 72% $H_2SO_4$, 25% para-chlorobenzene-sulfonic acid, about 2% DDT, and traces of water and hydrochloric acid, and having a dark brown color, was neutralized with a quantity of magnesium hydroxide "mud" as obtained from a vacuum filter during production of magnesia from brines and having a composition of about 44.7% MgO, 0.4% CaO, 54.6% water, and 0.3% chlorine. The neutralization of the waste oleum was carried out with good agitation and cooling, a small amount of water being added to provide a workable slurry. The resulting slurry had a pH of 7–8 and a temperature of about 90° C. The color was slightly yellow (below pH 7 the color was slightly pink). The hot slurry was then put in an oven where it was heated in an oxidizing atmosphere to 1200° F. until all organics were fully destroyed. During the heat treatment, the slightly yellow mass changed to black due to cracking and carbon formation from the organics, but at the final stage the mass was white. This marked the end of heat treatment.

The hot mass was then dropped into cold water, where it dissolved. It was filtered off from magnesium hydroxide and the filtrate cooled in order to obtain crystals of Epsom salt ($MgSO_4.7H_2O$). The resulting crystals were filtered off and dried to yield substantially pure Epsom salt and the mother liquor was saved for re-use in a subsequent neutralization.

Example 2

The procedure as described in Example 1 was repeated to the point of obtaining a hot neutralized slurry. To this slurry, additional hot water was added until all of the magnesium sulfate and magnesium salt of para-chlorobenzene-sulfonic acid went into solution. The white insoluble material remaining was DDT which was filtered off and recovered. The resulting filtrate was then cooled to about 48° C. causing precipitation of the magnesium sulfonate $Mg(C_6H_4ClSO_3)_2.6H_2O$, and this precipitate removed by filtration. The filtrate was further cooled to about 20° C. causing separation or crystallization of Epsom salt slightly contaminated with the magnesium sulfonate above mentioned. This crude Epsom salt was roasted at about 1200° F. in an oxidizing atmosphere to destroy the organic contaminents. The white product resulting from this heat treatment was then dissolved in water and the resulting solution cooled to crystallize Epsom salt therefrom which in every respect satisfied the specifications for a U. S. P. product.

Example 3

The procedure as described in Example 2 was repeated with the exception that the roasting of the crude Epsom salt was conducted in a neutral or non-oxidizing atmosphere. Under these conditions, there was merely a cracking or partial breakdown of the organic compounds and the roasted product was dark in color due to deposits of carbon and carbonaceous materials resulting from the organic impurities. Upon dissolving this discolored product in water, filtering the hot solution to remove the carbon and carbonaceous materials and then cooling the filtrate, substantial pure crystals of Epsom salt were obtained.

Example 4

A quantity of waste oleum containing 70% $H_2SO_4$, 0.7% organic compounds, and 29.3% water was neutralized with magnesium hydroxide "mud" as described in Example 1. The resulting neutral slurry was roasted in the manner described by heating to a temperature of about 1200° F. and the resulting hot clinker dissolved in water, filtered while hot, and the resulting filtrate cooled to thereby crystallize pure Epsom salt therefrom.

Example 5

About 200 grams of waste oleum having the composition described in Example 1 was mixed with about 700 grams of waste sulfuric acid from the production of chloral containing 70% $H_2SO_4$, 15% water, and 15% ethyl alcohol and other organic components. This mixture was neutralized with magnesium hydroxide "mud" as described in Example 1, and the neutral hot slurry was then put into a kiln and kept there at a temperature of about 1200° F. for an hour. The resulting hot clinker was dissolved in water, the hot solution obtained thereby was filtered, and upon cooling the filtrate, crystals of pure Epsom salt were obtained.

As used throughout the specification the expression "waste oleum" has reference to waste sulfuric acid obtained in procedures wherein oleum is employed. Whether or not such waste acid contains excess $SO_3$, thus retaining the characteristic property of oleum, is immaterial and as used in the claims the expression "waste sulfuric acid" shall be understood to embrace any of the waste acids referred to herein.

Various changes and modifications in the procedures herein described will occur to those skilled in the art and to the extent that such changes and modifications fall within the purview of the appended claims, it is to be understood that they constitute part of my invention.

I claim:

1. The process for treating waste sulfuric acid containing organic impurities, that comprises neutralizing said waste acid with magnesium hydroxide to form a slurry having a pH of about 7–8, diluting the slurry with sufficient water to dissolve soluble components, filtering off insoluble organic components, concentrating the filtrate to effect partial separation by crystallization of the soluble organic components, cooling the mother liquor to crystallize crude Epsom salt, drying and roasting said crude Epsom salt at a temperature of about 1200° F. until organic and carbonaceous materials present are substantially destroyed, transferring the resulting hot mass to water to dissolve soluble components, filtering the resulting solution while hot, and cooling the filtrate to thereby crystallize Epsom salt therefrom.

2. The process for treating waste sulfuric acid resulting from DDT production and containing substantial amounts of DDT and para-chlorobenzene-sulfonic acid that comprises neutralizing said acid with magnesium hydroxide to form a slurry having a pH of about 7–8, diluting the slurry with sufficient water to dissolve soluble components, filtering off the insoluble DDT, concentrating the resulting filtrate and cooling to about 48° C. to crystallize the bulk of the magnesium salt of para-chlorobenzene-sulfonic acid formed in the neutralization, further cooling the mother liquor to crystallize crude Epsom salt, drying and roasting said crude Epsom salt at a temperature of about 1200° F. until organic and carbonaceous components are substantially destroyed, transferring the resulting hot mass to water to dissolve soluble components, filtering the resulting solution while hot, and cooling the filtrate to crystallize Epsom salt therefrom.

References Cited in the file of this patent

UNITED STATES PATENTS

| | | |
|---|---|---|
| 1,977,560 | Martin | Oct. 16, 1934 |
| 2,309,633 | Du Pont | Feb. 2, 1943 |
| 2,384,009 | Bradenburg | Sept. 4, 1945 |
| 2,446,273 | Gary | Aug. 3, 1948 |

FOREIGN PATENTS

| | | |
|---|---|---|
| 2,737 | Great Britain | of 1876 |